United States Patent
Martin et al.

(10) Patent No.: US 9,477,835 B2
(45) Date of Patent: Oct. 25, 2016

(54) EVENT MODEL FOR CORRELATING SYSTEM COMPONENT STATES

(71) Applicant: CrowdStrike, Inc., Laguna Niguel, CA (US)

(72) Inventors: Daniel T. Martin, Burlington, NJ (US); David F. Diehl, Minneapolis, MN (US)

(73) Assignee: CrowdStrike, Inc., Irvine, CA (US)

( * ) Notice: Subject to any disclaimer, the term of this patent is extended or adjusted under 35 U.S.C. 154(b) by 0 days.

(21) Appl. No.: 14/048,920

(22) Filed: Oct. 8, 2013

(65) Prior Publication Data

US 2015/0101044 A1    Apr. 9, 2015

(51) Int. Cl.
*G06F 21/00* (2013.01)
*G06F 21/55* (2013.01)

(52) U.S. Cl.
CPC .................... *G06F 21/552* (2013.01)

(58) Field of Classification Search
USPC ...................................................... 726/22–24
See application file for complete search history.

(56) References Cited

U.S. PATENT DOCUMENTS

| 6,463,565 | B1 | 10/2002 | Kelly et al. | |
|---|---|---|---|---|
| 7,275,250 | B1 * | 9/2007 | Novik et al. | 719/318 |
| 7,668,953 | B1 * | 2/2010 | Sinclair et al. | 709/224 |
| 2003/0055668 | A1 | 3/2003 | Saran et al. | |
| 2007/0266394 | A1 | 11/2007 | Odent et al. | |

FOREIGN PATENT DOCUMENTS

| EP | 1378813 A2 | 1/2004 |
|---|---|---|
| KR | 20100052402 A | 5/2010 |
| KR | 20100078081 A | 7/2010 |

OTHER PUBLICATIONS

PCT Search Report and Written Opinion mailed Feb. 2, 2015 for PCT Application No. PCT/US14/55660, 9 Pages.

\* cited by examiner

*Primary Examiner* — Ghazal Shehni
(74) *Attorney, Agent, or Firm* — Lee & Hayes, PLLC

(57) ABSTRACT

A computing device described herein is configured to receive a notification of an event associated with a plurality of system components. In response, the computing device determines a state for the system components based on a state for one of those system components specified in an event model. That specified state in the event model reflects a previous occurrence of another event.

26 Claims, 4 Drawing Sheets

EVENT MODEL FOR CORRELATING SYSTEM COMPONENT STATES

BACKGROUND

With Internet use forming an ever greater part of day to day life, security exploits that steal or destroy system resources, data, and private information are an increasing problem. Governments and businesses devote significant resources to preventing intrusions and thefts related to these security exploits. Security exploits come in many forms, such as computer viruses, worms, trojan horses, spyware, keystroke loggers, adware, and rootkits. These exploits are delivered in or through a number of mechanisms, such as spearfish emails, clickable links, documents, executables, or archives. Some of the threats posed by security exploits are of such significance that they are described as cyber terrorism or industrial espionage.

To counter these threats, governments, enterprises, and individuals use a range of security applications and services. Typically, these applications and services scan a device for a signature or other sort of indication of a security exploit. Responsive to finding the signature or indication, the applications and services quarantine or delete the exploit. The applications and services often miss more sophisticated security exploits, however. For example, security applications and services lack an ability to correlate detected events. Such events may each, on their own, be innocent, but when observed together or in some sequence, the events may be indicative of security exploit activity.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Figure 1:
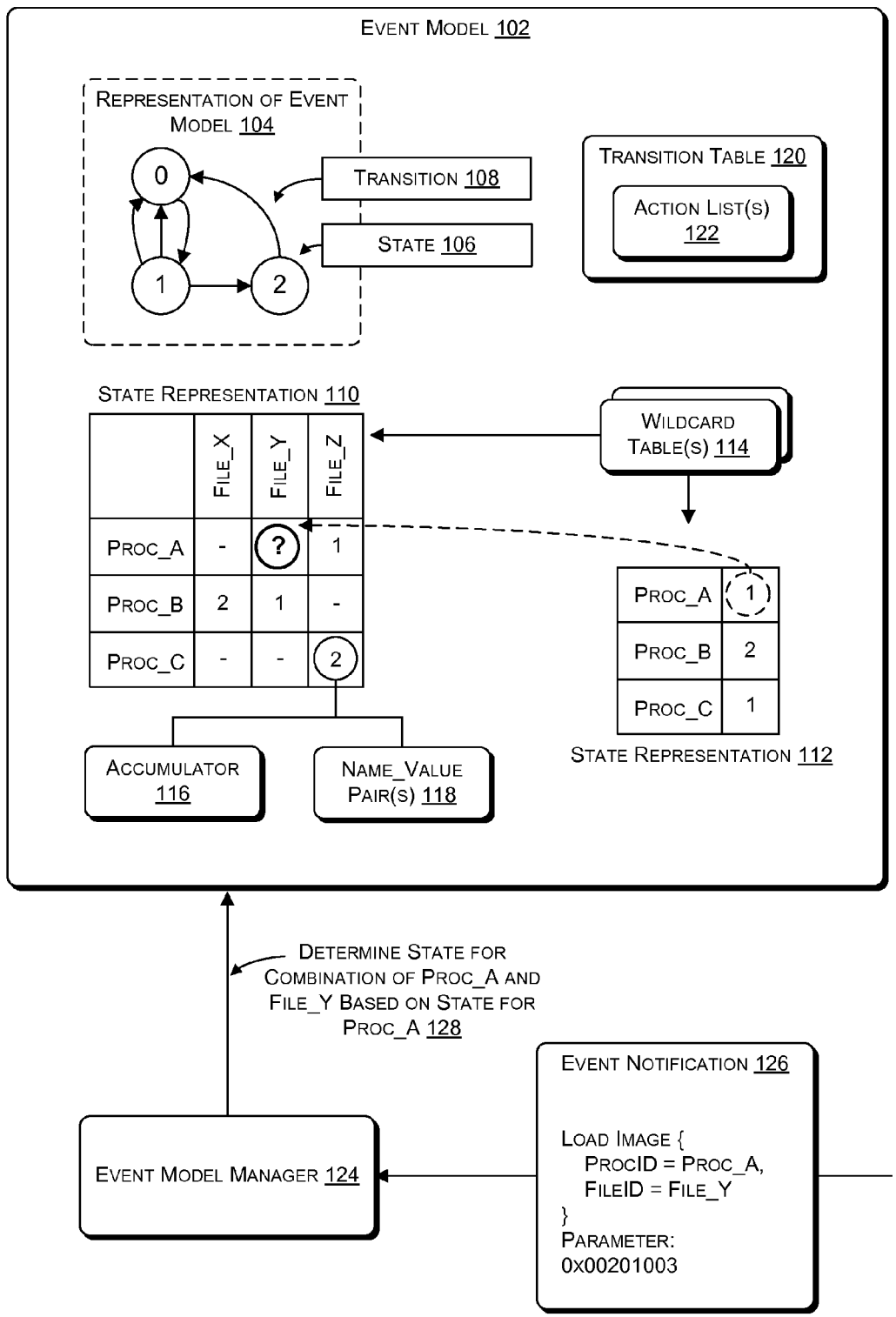
FIG. 1 illustrates an example event model which maintains states for system components, the states being determined responsive to events associated with the system components.

This disclosure describes, in part, an event model that correlates multiple events which share a common association with at least one system component. To correlate the events, the event model maintains a state for a system component determined responsive to a first event associated with that system component. Upon occurrence of a second event, such as an event associated with both the system component and another system component, a state for the combination of the system component and the other component is determined based both on the second event and on the state for the system component maintained in the event model. Thus, events which may have not been connected, such as an event affecting a process and a later event associated with that process and a file, are correlated by the event model.

In various embodiments, the event model may be a state machine comprising a plurality of states and transitions between those states. Each transition may be associated with one or more events. Further the event model may be associated with multiple state representations. The state representations may be tables or arrays, such as sparse tables or sparse arrays. Each state representation may be associated with a type of system component or with multiple types of system components. For example, one state representation may be a one-dimensional table or array associated with files and another state representation may be a two-dimensional table or array associated files and processes. A state for each entry (also referred to herein as an "instance" of the event model) in the one-dimensional table may be specified responsive to receiving notification of an event associated with a specific file that corresponds to the entry. A state for each entry in the two-dimensional table may be specified responsive to receiving notification of an event associated with a specific file and a specific process that correspond to the entry. If the specific file associated with an entry in the two-dimensional table is also associated with a state specified in the one-dimensional table, the state in the two-dimensional table may be determined based at least in part on the state specified in the one-dimensional table.

In some embodiments, each possible entry in a state representation may be set initially to a default state. In other embodiments, when a state representation is a sparse table, each entry may initially be null, with a null value for an entry indicating a default state. When notification of an event associated with a transition from a default state to another state is received, a corresponding entry in the sparse table may be created and set to the other state.

In some embodiments, a single event may affect several instances in a state representation. For instance, an event with only a process id may affect all or a subset of instances in a state representation indexed by both process id and file id. The event may affect some or all of the instances with a matching process id regardless of file id. To facilitate such actions, "wildcard tables" may be created which index entries in a state representation by zero or more dimensions (a "zero dimension" wildcard table, as used herein, has only a single entry and indexes every entry of an associated state representation). These wildcard tables may be used to collect relevant instances for an event and are updated whenever entries are added to or removed from a state representation. Note that some embodiments may include wildcard tables indexed by zero dimensions for the case when an event must affect all instances in a single state representation. (e.g., a regular timing event may advance the state of every instance in the state representation).

Instances of the event model (i.e., entries in a state representation of the event model) may also each be associated with one or both of an accumulator or name_value pair(s). An accumulator may include a count of occurrences of an event and a threshold. In some embodiments, a state may only be set or updated for an instance if the count of the accumulator meets or exceeds the threshold of the accumulator. Additionally or alternatively, the accumulator may maintain a value that is updatable based on the occurrence of one or more events, and the state may be set or updated based on the value maintained by the accumulator. The name_value pair(s) may describe information associated with an event, such as the event that led to the setting of the state for the instance having the name_value pairs.

In addition to the one or more state representations, the event model may further include a transition table. The transition table may include identifiers for each transition and a target/resulting state associated with each transition. In some embodiments, one or more of the transition identifiers may be associated with action lists. Each action list may include one or more actions to perform responsive to the occurrence of the transition, such as generating and dispatching an event. Alternatively or additionally, action lists may be associated with states of the state representation such that when an entry is set to a specified state, an action in an action list is performed (e.g., generating and dispatching an event).

In various embodiments, the event model may be managed by an event model manager. The event model manager may receive notifications of events, those notifications identifying one or more system components associated with each event and including a parameter to direct behavior of the event model manager. Upon receiving a notification, the event model manager retrieves the parameter and uses the parameter to identify A) a specific event model of a plurality of event models, B) entries in state representation(s) of the specific event model that are to be updated, and C) the transition associated with the event. The event model manager then uses the state representations, wildcard tables, and transition table of the specific event model, along with the parameter, to determine states and to set or update those states in one or more entries of the state representation(s) of the specific event model. If there is an action list associated with the transition specified by the parameter, the event model manager may perform those actions specified by the action list. For example, the event model manager may generate and dispatch an event. In some embodiments, the event model manager may receive notification of the same event multiple times with multiple, different parameters.

In some embodiments, the event model manager and one or more event models managed by that event model manager may be components of a security agent, such as a kernel-level security agent. The security agent may include an event bus that dispatches notifications of events to the event model manager and sets the parameters in those notifications based on a configuration of the security agent. That configuration may be updated without any reboot of the computing device or recompiling of the security agent and may cause an update to the event model or one or more components of the event model (e.g., transition table). The event bus may further receive events from the event model manager and dispatch those events to other components of the security agent. The security agent may be configured to perform at least one of monitoring events on a computing device, maintaining state about some or all of the events on a computing device, notifying a security service of one or more events on a computing device, or taking action responsive to a security exploit associated with one or more events on a computing device.

Example Event Model

FIG. 1 illustrates an example event model which maintains states for system components, the states being determined responsive to events associated with the system components. An event model 102, as shown by the representation of the event model 104, may be a state machine comprising multiple states 106 and transitions 108. An event model 102 may further include multiple state representations which may have differing numbers of dimensions, such as state representations 110 and 112. Each dimension of a state representation 110 or 112 may be associated with a wildcard table 114, which may specify which entries in that state representation 110 or 112 should be affected when accessing that state representation 110 or 112 by fewer than all the dimensions of the state representation. Also, one or more of the entries of a state representation 110 or 112 may be associated with an accumulator 116 or name_value pairs 118. In addition to state representations 110 and 112, an event model 102 may include a transition table 120, which maps transitions 108 to target states 106, and actions lists 122, which may each be associated with one or more of the transitions 108 listed in the transition table 120.

As illustrated, an event model manager 124 may receive event notifications 126 and update an event model 102 responsive to the event notifications 126. At 128, the event model manager 124 may determine a state to specify in the state representation 110 for a combination of system components based at least in part on a state specified for one of those system components in the state representation 112.

In various embodiments, the event model 102 may be a data structure or collection of data structures which represent state for system components or combinations of system components, such as processes, files, threads, modules, trees, etc. The represented state(s) in turn may reflect occurrence(s) of events associated with a system component or with multiple system components. As mentioned, each event model 102 may include one or more state representations, such as state representations 110 and 112, a transition table 120, and action list(s) 122. Each state representation 110 or 112 may be associated with one or more wildcard tables 114, and entry(s) of a state representation 110 or 112 may be associated with one or both of an accumulator 116 or name_value pairs 118. As shown by the representation of the event model 104, the event model 102 may be a state machine with multiple states 106 and transitions 108. For example, an instance of the event model 102 may be set to default state 106, such as a state 106 of value '0.' Responsive to notification that a first event associated with a first transition 108 has occurred, the event model manager 124 may set the state 106 for that instance to the value '1.' Each instance of the event model 102 may be associated with one or more system components and may be represented by an entry in one of the state representations 110 or 112.

Each state representation 110 or 112 may be a table or an array, such as a sparse table or sparse array. In FIG. 1, state representation 110 is shown as a two-dimensional sparse table and state representation 112 is shown as a one-dimensional table or sparse table. In embodiments in which the state representations 110 and 112 are sparse tables or sparse arrays, entries may initially be null, which may be indicative of a default state 106 (e.g., the '0' state) of the event model 102. In other embodiments, entries may initially by set to the default state 106.

In some embodiments, to track which entries of the state representations 110 and 112 are null and which are set to states 106, each dimension in the state representations 110 and 112 (e.g., each row or column) may be associated with a wildcard table 114. The wildcard tables 114 are each a table or array with between zero dimensions and the number of dimensions of the corresponding state representation 110 or 112. Each wildcard table 114 serves as an index to its state representation 110 or 112, indicating which indices are set to a state 106 and which are null. These wild card tables 114 may then be used by the event model manager 124 to select multiple entries from the state representations 110 and 112 to be changed by a single event. A single event may affect multiple entries not only in a single state representation 110 or 112, but also in multiple representations.

Any or all of the entries of the state representations 110 and 112 may be associated with an accumulator 116 or name_value pairs 118. An accumulator 116 may include a count of occurrences of an event and a threshold. In some embodiments, a state 106 may only be set or updated for an instance of the event model 102 (represented by an entry associated with an accumulator 116) if the count of the accumulator 116 meets or exceeds the threshold of the accumulator 116. Additionally or alternatively, the accumulator 116 may maintain a value that is updatable based on the occurrence of one or more events, and the state 106 may be set or updated based on the value maintained by the accumulator 116. The name_value pair(s) 118 may describe information associated with an event, such as the event that led to the setting of the state 106 for the instance having the name_value pairs 118.

The contents of the accumulator 116 may be queried or updated with arithmetic operations as specified in a transition's action list 122 (e.g., "increment", but also possibly including arbitrary addition, subtraction, floating point multiplication, etc.). The value stored in an accumulator 116 may be used to direct which actions within an action list 122 are performed, e.g. by requiring an action-specific threshold value. In some embodiments, the information stored in name_value pair(s) 118 may be set, changed, or used by actions in the action list 122. Alternatively, in some embodiments the information stored in name_value pair(s) 118 may be specified external to the action lists 122 or in a combination of external configuration and actions in the action lists 122.

In various embodiments, the transition table 120 may include identifiers for each transition 108 and a target/resulting state 106 associated with each transition 108. In some embodiments, one or more of the transition identifiers may be associated with action lists 122. Each action list 122 may include one or more actions for the event model manager 124 to perform responsive to the occurrence of the transition 108 associated with that action list 122 or responsive to the setting of a specific state 106 in one of the state representations 110 or 112. Such actions may include generating and dispatching an event.

In some embodiments, the event model manager 124 may be any sort of module or executable component. As described in detail below with respect to FIG. 2, the event model manager 124 may be a component of a kernel-level security agent 106 and may receive notifications of events from an event bus 218 and provide events to the event bus 218. The event model manager 124 may be responsible for managing a plurality of event models of the kernel-level security agent 206, such as the event model 102.

In some embodiments, the event notification 126 received by the event model manager 124 may include a parameter and identifications of one or more system components. The parameter may be a multi-part string or numeric value that includes a first part identifying an event model, such as the event model 102, a second part identifying which instances of the event model (i.e. entry(s) of state representations 110/112) to update (this second part may also be referred to as a "look up type"), and a third part identifying a transition 108 that is associated with the event. In other embodiments, the parameter may include additional parts or fewer parts.

The event model manager 124 may retrieve the different parts from the parameter responsive to receiving an event notification 126. In some embodiments, the event model manager 124 may receive multiple notifications 126 of the same event with multiple, different parameters. Based on the first part of the parameter, the event model manager 124 identifies an event model 102 of a plurality of event models managed by the event model manager 124. Each event model may be represented, for instance, by a numeric value.

Upon identifying the event model 102, the event model manager 124 may retrieve one or both of state representations 110 and 112, or portions thereof. In some embodiments, the event model manager 124 identifies entries of the state representations 110 and 112 based on the system component identifications included in the event notification 126, based on the look up type included in the second part of the parameter, or based on both. The lookup type may be an index to one or both of an entry of a state representation 110 or 112 or a wildcard table 114, and through the wildcard table 114, to one or more entries of a state representation 110 or 112. For example, the event notification 126 may identify a single system component (e.g., Proc_A) and the lookup type may specify that any entry for the system component (e.g., an entry in state representation 112) should be set or updated and any non-null entries associated with combinations of the single system component and other system components should be updated. This would include some, but not all, of the entries in the row of state representation 110 associated with Proc_A. The event model manager 124 utilizes the wildcard table 114 for the row of state representation 110 associated with Proc_A to identify which entries of that row are non-null. The event model manager 124 would then retrieve the identified entries.

In some embodiments, the event model manager 124 also utilizes the third part of the parameter identifying the transition 108 to retrieve the target state 106 from the transition table 120. The event model manager 124 then sets or updates the retrieved entries of the state representations 110 and 112 to the target state 106 retrieved from the transition table 120. In addition to setting or updating the retrieved entries, the event model manager 124 updates the wildcard tables 114. For example, if a previously null entry is set to the target state 106, a wildcard table 114 associated that includes the entry is updated to reflect that the entry is now non-null. In various embodiments, if the target state 106 is the default state (e.g., the value '0'), the event model manager 124 may set the one or more retrieved entries to null (i.e., delete the entries) and set any corresponding entries in wildcard table(s) 114 to null.

In some embodiments, one of the retrieved entries may be associated with an accumulator 116 and each time an event notification 126 is received in connection with that entry, the event model manager 124 updates the count or value of the accumulator 116. When that count meets or exceeds the threshold of the accumulator 116—and not before then—the event model manager 124 sets or updates the state 106 for that entry to the target state 106. Alternatively, the event model manager sets or updates the state 106 based on the updatable value maintained by the accumulator 116. In one embodiment, the accumulator 116 may include both a threshold and a time period such that the count must meet or exceed the threshold in the time period for the event model manager 124 to set or update the entry associated with the accumulator 116.

In further embodiments, as shown at 128, the event model manager 124 may determine the state 106 for a first entry in one state representation (e.g., state representation 110) based on the state specified for a second entry in another state representation (e.g., state representation 112) and set or update the first entry to the determined state 106. For example, state representation 112 may include an entry for the process Proc_A which was previously set or updated based on an event associated with Proc_A. State representation 110 may include an entry associated with both Proc_A and the file File_Y. The event model manager 124 may receive event notification 126 of an event associated with both Proc_A and File_Y, and the parameter in the event notification 126 may specify that the entry for Proc_A and File_Y in state representation 110 is to be updated. In determining the target state 106 to set or update the entry to, the event model manager 124 may utilize the transition table 120 and, if an accumulator 116 is associated with the entry, that accumulator 116. The event model manager 124 may also determine if another state representation (e.g., state representation 112) includes an entry for Proc_A alone or for File_Y alone. Either or both of such states may then be used in determining the target state 106.

In various embodiments, the event model manager 124 may also determine if the transition 108 identified in the parameter is associated with an action list 122. For example, the transition identifier in the transition table 120 may point to an action list 122. The event model manager 124 may then perform any or all of the actions listed in the action list 122. For instance, the action list may instruct that an event should be generated and dispatched (e.g., dispatched to the event bus 118). One such event could include, for example, name_value pairs 118, which store information about one or more events which led to a state for a given entry which is associated with those name_value pairs 118. In some embodiments, the performance of an action in the action list 122 may be conditioned on the status of an accumulator 116. For instance, if the count for an accumulator 116 does not meet or exceed a threshold of the accumulator 116, the event model manager 124 may refrain for performing an action in connection with the entry associated with that accumulator 116. Other actions listed in the action list 122 may include manipulation of the accumulator 116 (e.g. incrementing it by a set value, or floating point multiplication) or storing new information in the name_value pair(s) 118.

Example Security Agent

Figure 2:
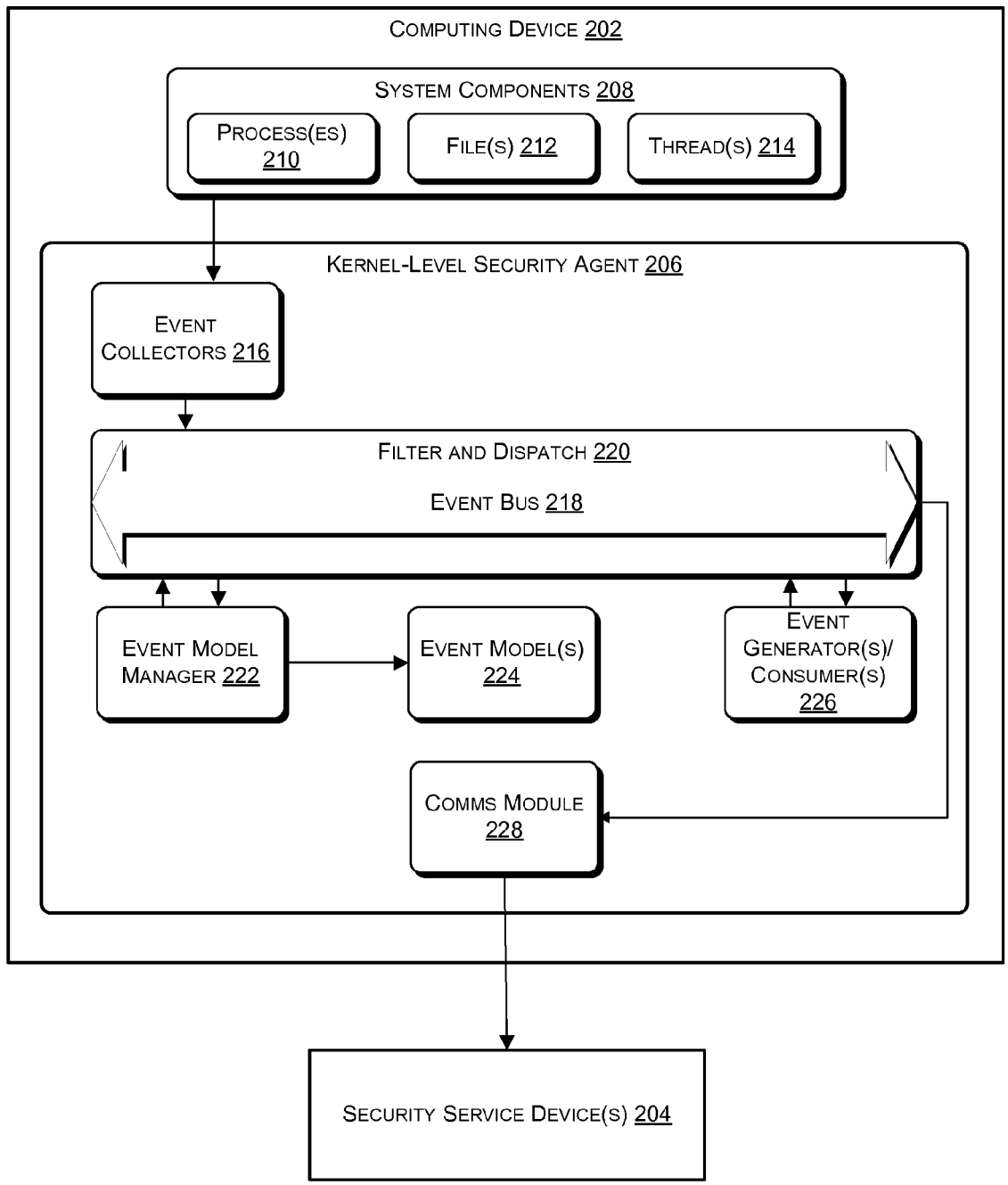
FIG. 2 illustrates an example security agent which includes an event model for maintaining states for system components, an event bus which notifies an event model manager of events associated with the system components, and the event model manager, which determines and specifies the states in the event model responsive to the events.

FIG. 2 illustrates an example security agent which includes an event model for maintaining states for system components, an event bus which notifies an event model manager of events associated with the system components, and the event model manager, which determines and specifies the states in the event model responsive to the events. As illustrated, a computing device 202 may receive security services from remote security service device(s) 204 working with a kernel-level security agent 206 installed on the computing device 202. The computing device 202 may include a plurality of system components 208, such as process(es) 210, file(s) 212, and thread(s) 214. The kernel-level security agent 206 includes an event collector 216 to collect events associated with system component(s) 208 and to dispatch those events to an event bus 218 of the kernel-level security agent 206. Based on filters and dispatch components 220 of the event bus 218, the event bus 218 provides notifications of events to an event model manager 222, which manages one or more event models 224. The event bus 218 may also distich events or notifications of events to other event generators and consumers 226 of the kernel-level security agent 206 or to the security service device(s) 204 through a communications module 228 of the kernel-level security agent 206.

Figure 3:
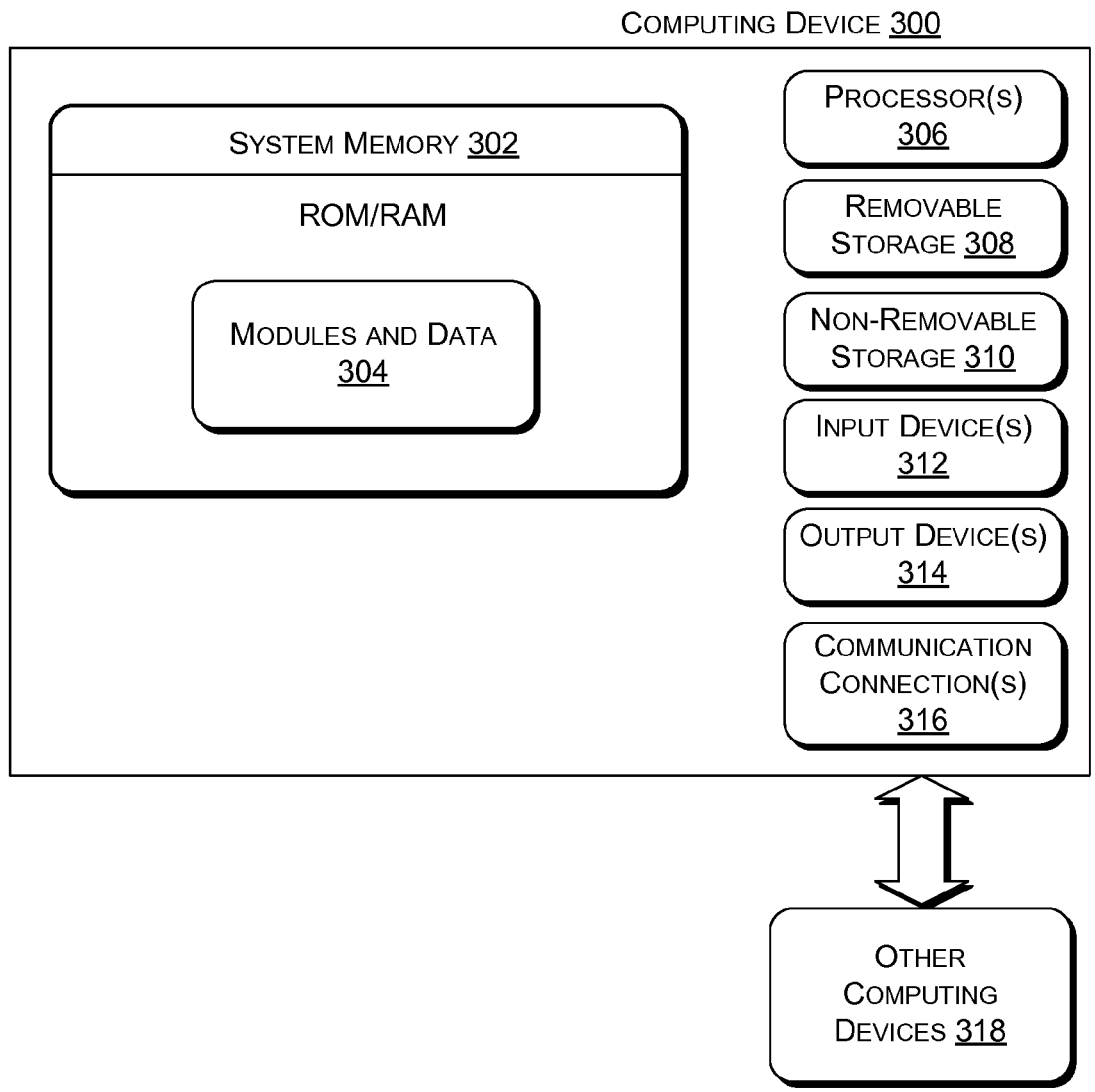
FIG. 3 illustrates a component level view of a computing device configured with an event model and an event model manager.

In various embodiments, the computing device 202 and security service device(s) 204 may each be or include a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. In one implementation, the security service device(s) 204 represent a plurality of computing devices working in communication, such as a cloud computing network of nodes. In some implementations, one or more of the computing device 202 and security service device(s) 204 represent one or more virtual machines implemented on one or more computing devices. An example computing device capable of serving as a computing device 202 is illustrated in FIG. 3 and described below with reference to that figure.

In some embodiments, the computing device 202 and security service device(s) 204 may be connected by one or more networks. The one or more networks may include any one or more networks, such as wired networks, wireless networks, and combinations of wired and wireless networks. Further, the one or more networks may include any one or combination of multiple different types of public or private networks (e.g., cable networks, the Internet, wireless networks, etc.). For example, the one or more networks may be a private network. In some instances, computing devices communicate over the one or more networks using a secure protocol (e.g., https) and/or any other protocol or set of protocols, such as the transmission control protocol/Internet protocol (TCP/IP).

In various embodiments, security service device(s) 204 may implement a security service. The security service may receive notifications of interesting events from kernel-level security agents 206 of computing devices 202, as well as forensic data associated with those interesting events. The security service device(s) 204 may determine if related notifications have been received from other computing devices 202 and/or evaluate the interesting event based on one or more rules or heuristics. The security service device(s) 204 may further perform any or all of generating an event and providing the event to a computing device 202 (e.g., for diagnostic or healing purposes), generating a configuration update, healing computing devices 202 associated with the interesting event, deceiving an adversary associated with malicious code, or notifying entities or persons associated with other computing device 202 of the potential malicious code. Upon generating a configuration update, the security service device(s) 204 may provide the configuration update to one or more computing devices 202. The security service device(s) 204 may also maintain and utilize one or more models, such as models specific to individual computing devices 202, to types of computing devices, to entities, or to a generic device. The security service device(s) 204 may update these models based on the received notifications and utilize the models in analyzing the interesting events.

In some embodiments, the system components 208 may include any sort of components of the computing device 202, such as process(es) 210, file(s) 212, and thread(s) 214. The system components 208 may also include trees, modules, or any other sort of components. For example, a process 210 may be a malicious process 210 that is initiated by a security exploit executable file 212, which is deleted by the malicious process 210 after its initiation.

As shown, the kernel-level security agent 206 may include event collectors 216, an event bus 218 and filter and dispatch 220, an event model manager 222, event model(s) 224, event generator(s) and consumer(s) 226, and communications module 228. The kernel-level security agent 206 may be installed by and configurable by a remote security service of the security service device(s) 204, receiving, and applying while live, reconfigurations of components of the kernel-level security agent 206. Such reconfigurations may cause updates to the event model 102 or to a component of the event model 102, such as the transition table 120. As mentioned above, the kernel-level security agent 206 may perform at least one of monitoring events on a computing device, maintaining state about some or all of the events on a computing device, notifying a security service of one or more events on a computing device, or taking action responsive to a security exploit associated with one or more events on a computing device. An example kernel-level security agent 206 is described in greater detail in U.S. patent application Ser. No. 13/492,672, entitled "Kernel-Level Security Agent" and filed on Jun. 8, 2012.

In various embodiments, the kernel-level security agent 206 includes event collectors 216. These event collectors 216 observe events associated with system components 208, which may be kernel-mode or user-mode components. Events may include both actions performed by system components 208, non-occurrence of expected actions of system components 208, and actors associated with the actions or expected actions. For example, an event collector 216 may register with a hook or filter to receive notifications of the occurrence or non-occurrence of certain events, such as file creates, reads and writes, and loading executables. Am event collector 216 may also monitor locations in memory or log files, or spawn a thread to do so, observing events associated with the log files or memory locations. An event collector 216 may observe multiple kinds of events, or each type of event may be associated with a different event collector 216. The events observed by the event collectors 216 may be specified by a configuration of the kernel-level security agent 206. In some embodiments, the event collectors 216 observe all events on the computing device 202 and the configuration specifies configurable filters 220 for filtering and dispatching those events via the event bus 218.

In various embodiments, a filtering and dispatch component 220, representative of configurable filters 220 each associated with one or more of the event collectors 216, event bus 218, event model manager 222, event model(s) 224, event generator(s) and consumer(s) 226, and/or communications module 228, receives observed events from the event collectors 216. While FIG. 2 illustrates the filtering and dispatch component 220 as being logically part of the event bus 218, the filtering and dispatch component 220 may instead comprise one or more components (e.g., configurable filters 220) that are separate from the event bus 218. Upon receiving events, the filtering and dispatch component 220 may perform any filtering specified by the configuration of the kernel-level security agent 206. For example, the configuration may determine which event model(s) 224 to update and specify a parameter to direct the event model manager 222 in updating the event model(s) 224. The filtering may also involve application of one or more rules or heuristics of the configuration.

Upon filtering the events, the filtering and dispatch component 220 may dispatch the events or notifications of the events using the event bus 218, which may be a throw-forward bus or other type of bus. The event bus 218 may in turn transmit events or notifications of the events to any or all of the event model manager 222, event generator(s) and consumer(s) 226, or communications module 228. In some embodiment, events that are significant in isolation or that necessitate the kernel-level security agent 206 to copy associated data associated with the events are dispatched via the event bus 218 to a scheduler of the kernel-level security agent 206 for scheduled delivery to the event model manager 222, event generator(s) and consumer(s) 226, or communications module 228. As these events are dispatched to a scheduler, they may be asynchronous events. In further embodiments, the event bus 218 rather than the filter and dispatch component 220 may be configured to determine which event model(s) 224 to update and specify a parameter to direct the event model manager 222 in updating the event model(s) 224. Such determining and specifying may be performed based on a configuration of the kernel-level security agent 206.

In various embodiments, the event manager module 222 may be an example of the event manager module 124 described above with respect to FIG. 1. The event model(s) 224 may also be examples of the event model 102 described above with respect to FIG. 1. In U.S. patent application Ser. No. 13/492,672, components similar to the event model(s) 224 are referred to as correlators.

Event generator(s) and consumer(s) 226 may include modules that take actions and models for storing data, such as a situational model. The situational model may comprise any one or more databases, files, tables, or other structures that track attributes, behaviors, and/or patterns of objects or processes of the computing device 202. Such modules of the event generator(s) and consumer(s) 226 may participate in building the situational model, in utilizing the situational model to validate state information, and in utilizing the situational model as a cache. Upon receiving events from filters and the event bus 218, the event generator(s) and consumer(s) 226 may determine, based on the configuration received from the security service device(s) 204 and on the type of the event whether to retrieve state information from the execution activities or system component(s) 208 that include or generated the event. Such state information may comprise a copy of a process 210, file 212, or thread 214, information drawn from a memory of the process, contents of a call stack associated with that process, data written or read by that process, etc. The event generator(s) and consumer(s) 226 may then provide one or both of the events and state information to the situational model.

Also, the event generator(s) and consumer(s) 226 may query the situational model to determine attributes, behaviors, and/or patterns or other descriptions associated with the event. Based on those attributes, behaviors, and/or patterns, descriptions, or other rules or heuristics specified by the configuration of the kernel-level security agent 206, the event generator(s) and consumer(s) 226 may determine that the event is interesting in some fashion and/or may be associated with malicious code. Upon determining that an event is interesting, potentially associated with malicious code, or upon receiving an event generated by the security service device(s) 204, event generator(s) and consumer(s) 226 may update the situation model, may notify the security service device(s) 204 of the event, or may heal the computing device 202. The healing may involve halting a process associated with the event (e.g., a process 210), deleting a process associated with the event (or malicious code (e.g., a file 212) associated with that process), or deceiving an adversary associated with malicious code that is in turn associated with the event. Such deceiving may be achieved by falsifying data acquired by the malicious code or by falsifying the data transmitted to the adversary. The action taken may be determined by the configuration of the kernel-level security agent 206. In some embodiments, event generator(s) and consumer(s) 226 may perform the healing responsive to receiving instructions from the security service device(s) 204 to perform the healing.

In various embodiments, the kernel-level security agent 206 includes the communications module 228. The communications module 228 may represent network protocol stack(s), network interface driver(s), and any other network interface components utilized by the kernel-level security agent 206 to communicate with the security service device(s) 204 over one or more networks. The communications module 228 may be a kernel mode component of the computing device 202. Further, the communications module 228 may transmit events, other notifications, and data associated events from the kernel-level security agent 206 to the security service device(s) 204. The communications module 228 may also transmit configuration updates received from the security service device(s) 204 to a configuration manager of the kernel-level security agent 206 and healing instructions and/or events from the security service device(s) 204 to the event bus 218 for filtering and dispatch.

Example System

FIG. 3 illustrates a component level view of a computing device 300 such as a computing device configured with an event model and event model manager. As illustrated, computing device 300 comprises a system memory 302 storing modules and data 304. Also, computing device 300 includes processor(s) 306, a removable storage 308 and non-removable storage 310, input device(s) 312, output device(s) 314 and communication connections 316 for communicating with other computing devices 318.

In various embodiments, system memory 302 is volatile (such as RAM), non-volatile (such as ROM, flash memory, etc.) or some combination of the two. The modules or data 304 stored in the system memory 302 may comprise methods, threads, processes, applications or any other sort of executable instructions, such as the instructions utilized to perform the operations of the computing device 202 or of any computing device configured with an event model manager 124 and event model 102. The modules and data 304 may also include files and databases, such as file and databases storing data associated with an event model 102.

In some embodiments, the processor(s) 306 is a central processing unit (CPU), a graphics processing unit (GPU), or both CPU and GPU, or other processing unit or component known in the art.

Computing device 300 also includes additional data storage devices (removable and/or non-removable) such as, for example, magnetic disks, optical disks, or tape. Such additional storage is illustrated in FIG. 3 by removable storage 308 and non-removable storage 310. Tangible computer-readable media may include volatile and nonvolatile, removable and non-removable media implemented in any method or technology for storage of information, such as computer readable instructions, data structures, program modules, or other data. System memory 302, removable storage 308 and non-removable storage 310 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 300. Any such tangible computer-readable media may be part of the computing device 300.

Computing device 300 also has input device(s) 312, such as a keyboard, a mouse, a touch-sensitive display, voice input device, etc., and output device(s) 314 such as a display, speakers, a printer, etc. These devices are well known in the art and need not be discussed at length here.

Computing device 300 also contains communication connections 316 that allow the computing device 300 to communicate with other computing devices 318, such as other computing devices 202 or the security service device(s) 204.

Example Process

Figure 4:
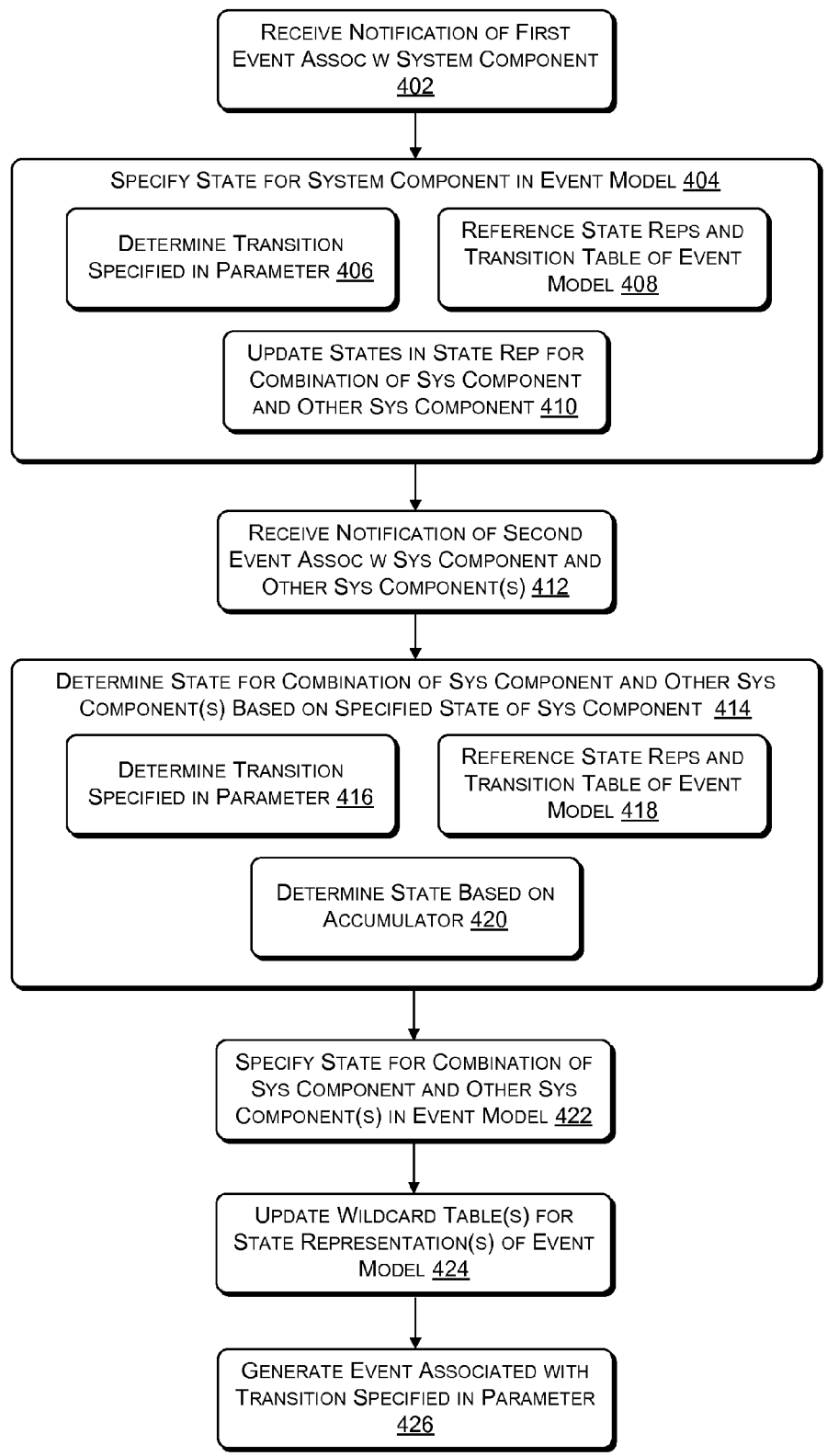
FIG. 4 illustrates an example process for receiving a notification of an event associated with a plurality of system components and, in response, determining a state for the system components based on a state for one of those system components specified in an event model, that specified state reflecting a previous occurrence of another event.

FIG. 4 illustrates an example process. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process for receiving notification of an event associated with a plurality of system components and, in response, determining a state for the system components based on a state for one of those system components specified in an event model, that specified state reflecting a previous occurrence of another event. In some embodiments, an event model manager is configured to perform at least a part of the process.

The process includes, at 402, receiving, by a computing device, a first notification of a first event associated with a system component. In some embodiments, the first event is associated with a first plurality of system components. The system component may be a process, a file, or a thread. The first notification may be received from an event bus of a kernel-level security agent.

At 404, responsive to receiving the first notification, the computing device specifies a state for the system component in an event model. The event model may be a state machine and is associated with multiple state representations. The specifying includes, at 406, determining a transition to the specified state based on a parameter included with the first notification. The parameter may specify the event model, parts of event model state representations that should be updated, and the transition. The computing device then locates the transition in a transition table of the event model and locates entries for the system component in one or more state representations of the event model. The specifying further includes, at 408, determining the state based on the transition table and state representation(s). This determined state is the state specified in the event model at 404. In some embodiments, at least one of the state representations is a sparse table that only specifies states for system components or combinations of system components that are associated with events. At 410, the specifying includes updating states in the sparse table responsive to receiving the notification of the first event. The updating includes updating states in a row or a column of the sparse table, the row or column being associated with the system component.

At 412, the computing device receives a second notification of a second event associated with a plurality of system components. The system component identified in the first notification is one of the plurality of system components identified in the second notification. The plurality of system components may, in some embodiments, be smaller than the first plurality of system components. The second notification may also be received from the event bus of the security agent.

At 414, the computing device determines a state for the plurality of system components based at least in part on the specified state for the system component. The determining includes, at 416, determining a transition to the state for the system components based on a parameter included with the second notification. The parameter may specify the event model, parts of event model state representations that should be updated, and the transition. The computing device then locates the transition in a transition table of the event model and locates entries for the combination of the system components in one or more state representations of the event model. The determining further includes, at 418, determining the state based on the transition table and state representation(s). Further, the determining may include, at 420, determining the states based on an accumulator. The accumulator may be associated with an instance of the event model which is in turn associated with the combination of the system components by one of the state representations. The accumulator may keep a count of notifications received for the second event and determine the state when that count meets or exceeds a threshold. Alternatively, the accumulator may maintain a value that is updatable based on the occurrence of one or more events, and the state may be set or updated based on the value maintained by the accumulator. At 422, the computing device then specifies the determined state in a state representation of the event model.

At 424, the computing device updates one or more wildcard tables associated with the state representations of the event model. Each wildcard table is specific to a subset of dimension(s) of state representation and includes indices for that subset associated with specified states. For example, if a state representation is a sparse table, some entries of a row may include specified states, and others may be null. An entry for such a row in a wildcard table identifies indices of entries that include specified states. When specifying a state for an entry that was previously null, or when removing/setting to null an entry that was previously not null, the computing device updates one or more wildcard tables to reflect the change.

At 426, the computing device generates an event responsive to the first event or the second event and dispatches the generated event to the event bus of the security agent. The generating of the event may be an action included in an action list. The action list may be associated with the transition resulting from the first event or the second event or with the state set by that transition.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
   receiving a first notification of a first event associated with a system component;
   specifying a state for the system component in an event model;
   receiving a second notification of a second event associated with a plurality of system components which include the system component; and
   based at least in part on the specified state for the system component, determining a state for the plurality of system components.

2. The method of claim 1, wherein the system components include at least one of a process, a file, or a thread.

3. The method of claim 1, wherein the first event is associated with another plurality of system components, the other plurality of system components being larger than the plurality of system components.

4. The method of claim 1, wherein the event model is a state machine and is associated with multiple state representations.

5. The method of claim 4, wherein at least one of the state representations is multi-dimensional table, each dimension being associated with a system component type of and at least one entry in the multi-dimensional table specifying a state for a combination of system components.

6. The method of claim 4, wherein at least one of the first event and the second event is associated with a transition from first state to a second state.

7. The method of claim 6, further comprising determining that the transition leads from the first event to the second event by referencing a transition table associated with the event model.

8. The method of claim 1, wherein the event model is associated with a sparse table or sparse array that only specifies states for system components or combinations of system components that are associated with events.

9. The method of claim 8, wherein a state representation of the event model is associated with a wildcard table which identifies indices of instances of the event model that are to be updated responsive to an occurrence of an event.

10. The method of claim 9, further comprising updating the wildcard table responsive to specifying a state in a sparse table or sparse array for a system component or a combination of system components that was not previously associated with an event.

11. The method of claim 8, further comprising updating states in the sparse table responsive to receiving the notification of the first event, the updating including updating states in a row or a column of the sparse table.

12. The method of claim 1, wherein the determining includes referencing state representations of the event model and a transition table associated with the event model.

13. One or more non-transitory computer-readable media having stored thereon computer-executable instructions which, when executed by a computing device, cause the computing device to perform operations comprising:
   receiving a first notification of a first event associated with a system component;
   specifying a state for the system component in an event model;
   receiving a second notification of a second event associated with a plurality of system components which include the system component; and
   based at least in part on the specified state for the system component, determining a state for the plurality of system components.

14. The one or more non-transitory computer-readable media of claim 13, wherein the operations further comprise generating an event responsive to the first event or the second event and dispatching the generated event to an event bus.

15. The one or more non-transitory computer-readable media of claim 13, wherein the operations further comprise identifying a transition associated with the first event or the second event, retrieving an action list associated with the transition in a transition table of the event model, and performing at least one action specified in the action list.

16. A system comprising:
one or more processors;
a kernel-level security agent configured to be operated by the one or more processors, the kernel-level security agent including:
an event bus configured to receive and dispatch events associated with system components;
an event model configured to maintain states for system components and combinations of system components; and
an event model manager configured to receive notifications of events from the event bus and to determine a state for a combination of components based at least in part on an event and on a state for one component of the combination of system components that is maintained by the event model.

17. The system of claim 16, wherein the event bus provides a parameter with an event when dispatching that event to the event model manager.

18. The system of claim 17, wherein the parameter specifies A) the event model, B) which instances of the event model are to be updated based on the event, and C) a transition from one state in the event model to another state in the event model.

19. The system of claim 17, wherein the event model manager is configured to determine the state based on the parameter.

20. The system of claim 17, wherein the event bus determines the parameter based on a configuration of the kernel-level security agent.

21. The system of claim 20, wherein the event bus further determines the parameter based on the event passing one or more filters and dispatches the event to the event model manager multiple times with multiple different parameters.

22. The system of claim 20, wherein at least a component of the event model is updated in response to an updated configuration of the kernel-level security agent without any reboot of the system or recompile of the kernel-level security agent.

23. The system of claim 16, wherein the kernel-level security agent is configured to perform at least one of monitoring events on a computing device, maintaining state about some or all of the events on the computing device, notifying a security service of one or more events on the computing device, or taking action responsive to a security exploit associated with one or more events on the computing device.

24. The system of claim 16, wherein the states in the event model are associated with name_value pairs which describe information associated with events.

25. The system of claim 16, further comprising an accumulator associated with the event model, the accumulator maintaining a count of occurrences of a specific event, wherein the event model manager is further configured to determine the state based at least in part on the count maintained by the accumulator.

26. The system of claim 16, further comprising an accumulator associated with the event model, the accumulator maintaining a value that is updatable responsive to occurrence of one or more events, wherein the event model manager is further configured to determine the state based at least in part on the value maintained by the accumulator.

* * * * *